United States Patent

Moriyama et al.

Patent Number: 5,776,012
Date of Patent: Jul. 7, 1998

[54] SOLID GOLF BALL

[75] Inventors: Keiji Moriyama; Takeshi Asakura; Yoshikazu Yabuki, all of Shirakawa, Japan

[73] Assignee: Sumitomo Rubber Industries, Ltd., Hyogo-ken, Japan

[21] Appl. No.: 678,327

[22] Filed: Jul. 11, 1996

[30] Foreign Application Priority Data

Jul. 13, 1995 [JP] Japan ................... 6-201755

[51] Int. Cl.$^6$ .................... A63B 37/06; A63B 37/12
[52] U.S. Cl. ................ 473/372; 473/377; 473/378
[58] Field of Search ................ 472/372, 377, 472/378

[56] References Cited

U.S. PATENT DOCUMENTS 5,490,673  2/1996  Hiraoka ............... 473/372 X
5,605,968  2/1997  Egashira et al. ...... 473/372 X Primary Examiner—George J. Marlo

[57] ABSTRACT

A solid golf ball comprising a core and a cover wherein the core has a diameter of not more than 36.7 mm and a hardness (JIS-C hardness) in a range from 65.5 to 72 from a center to an outer surface thereof. The core is formed from a vulcanized molded material of a rubber composition comprising a base rubber, a metal salt of an unsaturated carboxylic acid, an organic peroxide, an organosulfur compound and/or metal-containing organosulfur compound and a filler. A difference between the hardness (JIS-C hardness) at the center of the core and that at any part from the center to the outer surface of the core is not greater than 5. The cover has a specific gravity of less than 1.2, a thickness of 3 to 5 mm and a hardness (Shore-D scale hardness) of 60 to 70.

1 Claim, 1 Drawing Sheet

SOLID GOLF BALL

FIELD OF THE INVENTION

The present invention relates to a solid golf ball comprising a core and a cover covering the core. More particularly, it relates to a solid golf ball having good feeling at the time of hitting and excellent flight performance.

BACKGROUND OF THE INVENTION

A two-piece solid golf ball is used by a lot of golfers, particularly amateur golfers, because a long flight distance is easily attained. However, it has the problem it creates a hard feeling at the time of hitting (shot feel) which is inferior to that of a thread wound golf ball.

Therefore, a soft type two-piece solid golf ball has been suggested, in order to obtain a soft, shot feel which is similar to that of the thread wound golf ball.

However, it is necessary to use a soft core to obtain a soft type two-piece solid golf ball, and the use of the soft core causes the problem that the restitution performance of the golf ball deteriorates which makes it impossible to obtain the long flight distance which is characteristic of a two-piece solid golf ball.

The present inventors have worked toward overcoming the above problems. As a result, it has been found that shot feel can be improved by controlling the diameter and hardness of the core as well as by controlling the specific gravity, a thickness and a hardness of the cover within a specific range without causing a deterioration in the flight performance, even if a comparatively soft core is used in order to improve shot feel. Thus, the present invention has been completed with this in mind.

OBJECTS OF THE INVENTION

An object of the present invention is to solve the above problems of conventional solid golf balls and to improve shot feel at the time of hitting without causing a deterioration in the excellent flight performance of a solid golf ball thus a solid golf ball having good shot feel and excellent flight performance hereinbelow provided.

This object as well as other objects and advantages of the present invention will be apparent to those skilled in the art from the following description with reference to the accompanying drawings.

SUMMARY OF THE INVENTION

Figure 1:
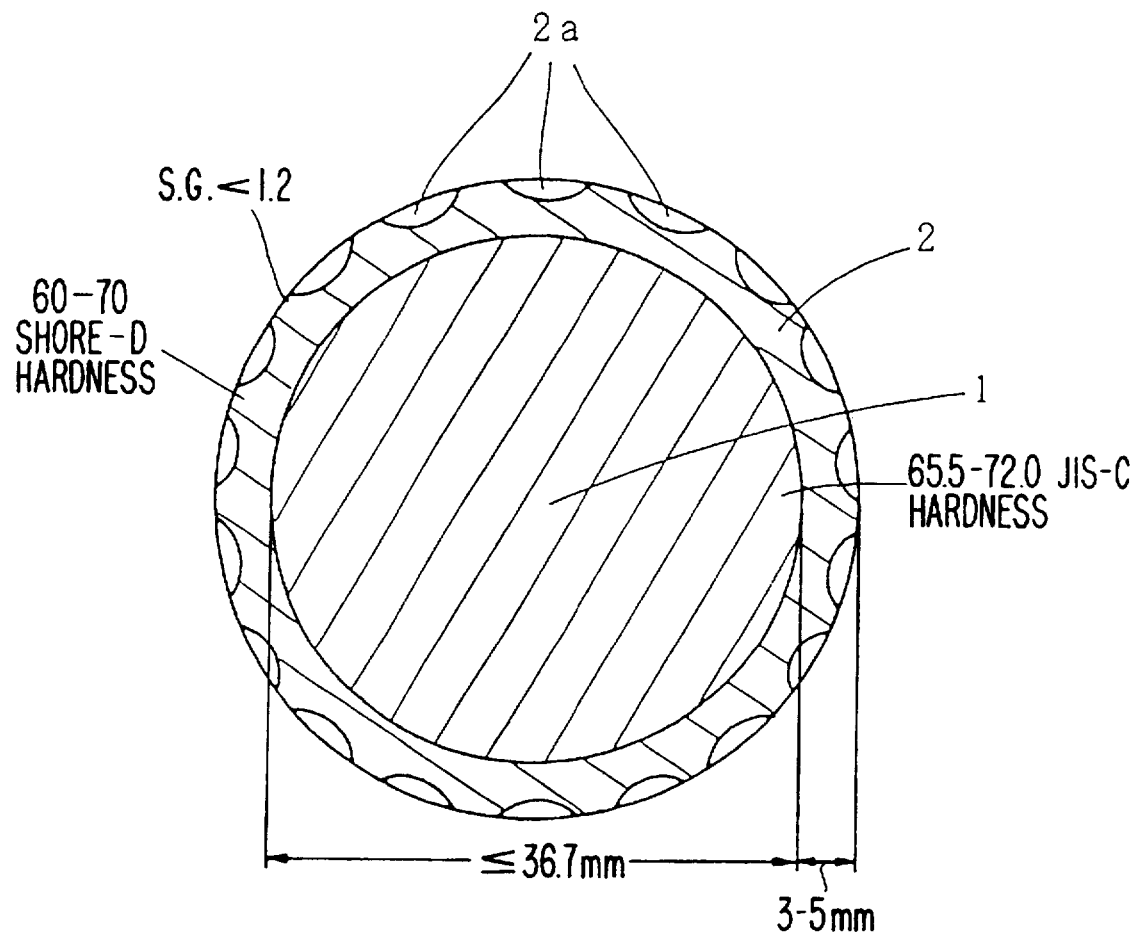
FIG. 1 is a schematic cross section illustrating one embodiment of the solid golf ball of the present invention.

The present invention provides a solid golf ball comprising a core and a cover covering the core, wherein the core has a diameter of not more than 36.7 mm, a hardness (JIS-C hardness) of 50 to 80 and the cover has a specific gravity of less than 1.2, a thickness of 3 to 5 mm and a hardness (Shore-D scale hardness) of 60 to 70.

In order to carry out the present invention, it is preferred that the difference between the hardness (JIS-C hardness) at the center of the core and that at any part from the center to surface of the core is within ±5.

DETAILED DESCRIPTION OF THE INVENTION

Hereinafter, the present invention will be explained in detail. In the present invention, a diameter of the core is adjusted to not more than 36.7 mm, which is smaller than that of a conventional golf ball. When the diameter of the core is larger than 36.7 mm, the thickness of the cover is small and it is difficult to obtain a difference in performance between the golf ball of the present invention and the conventional two-piece solid golf ball. On the other hand, when the diameter of the core is too small, the thickness of the cover is large and, therefore the shot feel is hard. Therefore, it is particularly preferred that the diameter of the core is from 34.7 to 36.7 mm.

In the present invention, a hardness (JIS-C hardness) of the core is preferably from 50 to 80, particularly from 60 to 75. When the hardness (JIS-C hardness) of the core is lower than 50, the core is too soft and the restitution performance of the golf ball deteriorates, which results in a decrease in the flight distance of the golf ball. On the other hand, when the hardness (JIS-C hardness) of the core is higher than 80, shot feel is too hard and inferior. It is preferred that a difference between the hardness (JIS-C hardness) at the center of the core and that at any part from the center to surface of the core is within ±5. That is, when using such a core having a small difference in hardness, a golf ball having high rebound performance can be easily obtained. The JIS-C hardness is a hardness measured by a JIS-C type hardness tester, which is equal to Shore C hardness.

The above core is composed of a vulcanized (crosslinked) molded material of a rubber composition. The rubber composition comprises a base rubber (e.g. high-cis polybutadiene rubber, etc.), a metal salt of α,β-unsaturated carboxylic acid (e.g. zinc acrylate, zinc methacrylate, etc.), an organic peroxide, an organosulfur compound and/or metal-containing organosulfur compound and a filler.

The base rubber of the rubber composition for the core preferably is the above-described high-cis polybutadiene. In addition, it may be a mixture obtained by blending (mixing) natural rubber, polyisoprene rubber, styrene-butadiene rubber, etc. with the above high-cis polybutadiene rubber.

The metal salt of α,β-unsaturated carboxylic acid serves to crosslink the rubber. The metal salt of α,β-unsaturated carboxylic acid, for example, includes zinc and magnesium salts of an α,β-unsaturated carboxylic acid (e.g. acrylic acid, methacrylic acid, etc.). The amount of the metal salt of α,β-unsaturated carboxylic acid formulated is not specifically limited, but is preferably from 15 to 30 parts by weight, based on 100 parts by weight of the base rubber.

The organic peroxide serves as an initiator when crosslinking the rubber. The organic peroxide includes dicumyl peroxide, 1,1-bis(t-butylperoxy)-3,3,5-trimethylcyclohexane, 2,5-dimethyl-2,5-di(t-butylperoxy)hexane, di-t-butyl peroxide, etc. The amount of the organic peroxide formulated is not specifically limited, but is preferably from 0.5 to 3 parts by weight, based on 100 parts by weight of the base rubber.

The organosulfur compound and metal-containing organosulfur compound serve to accelerate mastication of the rubber, thereby enhancing the rebound performance of the soft part of the core. The organosulfur compound can be diphenyl disulfide, dixylyl disulfide, pentachlorothiophenol, thiobenzoic acid, morpholine disulfide, etc. The metal-containing ogrganosulfur compound can be zinc salts of thiophenols and thiocarboxylic acids. These organosulfur and metal-containing organosulfur compounds can be used alone or in combination thereof. An amount of these organosulfur and metal-containing organosulfur compound formulated is not specifically limited. When each compound is used alone, an amount of the organosulfur compound formulated is preferably from 0.3 to 2.3 parts by weight based on 100 parts by weight of the base rubber and that of the metal-containing organosulfur compound formulated is preferably from 0.3 to 2.3 parts by weight based on 100 parts by weight of the base rubber. When using them in combination, the total amount of them is preferably from 0.3 to 2.3 parts by weight based on 100 parts by weight of the base rubber.

The filler includes zinc oxide, barium sulfate, calcium carbonate, etc. An amount of the filler formulated is not specifically limited, but is preferably from 20 to 40 parts by weight based on 100 parts by weight of the base rubber.

The core can be obtained by subjecting the above rubber composition for the core to vulcanization (crosslinking) molding to form a spherical material. In the vulcanization molding, for example, a press molding is used. The press molding is conducted by charging the above rubber composition for the core into a mold, followed by heating under pressure at 140° to 180° C. for 10 to 60 minutes. The heating during vulcanization molding may also be conducted in two or more stages.

In the present invention, a specific gravity of the cover is adjusted to less than 1.2. When the specific gravity of the resin is larger than 1.2, the ball weight is too large and it is difficult to produce a golf ball which satisfies the prescribed weight for a golf ball. On the other hand, when the specific gravity of the cover is too small, the moment of inertia of the golf ball itself is likely to is small. The specific gravity is preferably within the range from 0.9 to 1.2.

In the present invention, a thickness of the cover is from 3 to 5 mm, which is larger than that of a conventional golf ball, preferably from 3 to 4 mm. When the thickness of the cover is larger than 5 mm, the shot feel is harder and inferior. On the other hand, when the thickness of the cover is smaller than 3 mm, a difference in feature between the golf ball of the present invention and conventional golf ball disappeared.

A hardness (Shore-D scale hardness) of the cover is from 60 to 70, preferably from 63 to 67. When the hardness (Shore-D scale hardness) of the cover is larger than 70, the durability of the golf ball is deteriorated. On the other hand, when the hardness (Shore-D scale hardness) of the cover is smaller than 60, flight distance is lowered.

The cover is generally formed from the resin composition containing the ionomer resin as the main component. Examples of the ionomer resin which is commercially available from Mitsui Du Pont Polychemical Co., Ltd. are ionomer resins such as Hi-milan 1605 (Na), Hi-milan 1707 (Na), Hi-milan AM7318 (Na), Hi-milan 1705 (Zn), Hi-milan 1706 (Zn), Hi-milan 1652 (Zn), Hi-milan AM7315 (Zn), Hi-milan AM7317 (Zn), Hi-milan AM7311 (Mg), Hi-milan MK7320 (K); and terpolymer copolymer ionomer resins such as Hi-milan 1856 (Na), Hi-milan 1855 (Zn), Hi-milan AM7316 (Zn), etc. Examples of the ionomer resin which is commercially available from Du Pont Co., U.S.A. include ionomer resins such as Surlyn 8920 (Na), Surlyn 8940 (Na), Surlyn AD8512 (Na), Surlyn 9910 (Zn), Surlyn AD8511 (Zn), Surlyn 7930 (Li), Surlyn 7940 (Li); and terpolymer copolymer ionomer resins such as Surlyn AD8265 (Na), Surlyn AD8269 (Na), etc. Examples of the ionomer resin which is commercially available from Exxon Chemical Co. include Iotek 7010 (Zn), 8000 (Na), etc. In addition, Na, Zn, K, Li, Mg, etc., which are described in parenthesis following the trade name of the above ionomer resin, mean neutralizing metal ion species thereof.

It is possible to optionally add inorganic fillers (e.g. zinc oxide, barium sulfate, etc) and additives (e.g. titanium dioxide, etc.) for coloring to the cover composition.

A method of covering the cover is not specifically limited, but may be a normal method. For example, a method comprising molding a cover composition into a semispherical half-shell in advance, covering a core with two half-shells and then subjecting to a pressure molding at 130° to 170° C. for 1 to 15 minutes, or a method comprising injection molding the cover composition directly on the core to cover the core is used. When molding the cover, dimples may be optionally formed on the cover surface. After molding the cover, paint finishing and stamping may be optionally conducted.

Next, one embodiment of the solid golf ball of the present invention will be explained with reference to the accompanying drawing.

FIG. 1 is a schematic cross section illustrating one embodiment of the solid golf ball of the present invention. The solid golf ball shown in FIG. 1 is a two-piece solid golf ball comprising a core 1 of the vulcanized molded material of the rubber composition and a cover 2 covering the core. The core 1 is referred to as a solid core and, as described above, the core 1 has a diameter of not more than 36.7 mm and a hardness (JIS-C hardness) of 50 to 80. The cover 2 has a specific gravity of less than 1.2, a thickness of 3 to 5 mm and a hardness (Shore D-scale hardness) of 60 to 70. 2a in FIG. 1 indicates dimples and the suitable number/embodiment of dimples 2a may be optionally provided on the cover 2 so as to obtain the desired characteristics. Then, painting, marking, etc. may be optionally provided on the surface of the golf ball.

As described above, the present invention could provide a solid golf ball having good shot feel and excellent flight performance.

EXAMPLES

The following Examples and Comparative Examples further illustrate the present invention in detail but are not to be construed to limit the present invention to their details.

Examples 1 to 4 and Comparative Examples 1 to 6

Core composition A to F were prepared according to the formulation shown in Table 1. The unit of the amount of the respective components to be formulated is "parts by weight".

TABLE 1

|  | A | B | C | D | E | F |
|---|---|---|---|---|---|---|
| BR-18 X·1 | 100 | 100 | 100 | 100 | 100 | 100 |
| Zinc acrylate | 26 | 25 | 13 | 20 | 28 | 22 |
| Zinc oxide | 29.9 | 31.7 | 35.6 | 36.9 | 24.6 | 31.2 |
| Antioxidant X·2 | 0.5 | 0.5 | 0.5 | 0.5 | 0.5 | 0.5 |
| Dicumyl peroxide | 2.0 | 1.3 | 1.0 | 1.3 | 2.0 | 1.6 |
| Balnok R X·3 | 0.76 | 0 | 0 | 0 | 0.76 | 0 |
| Diphenyl disulfide | 0 | 0 | 0 | 0 | 0 | 0.5 |

X·1: Trade name, high-cis polybutadiene manufactured by Japan Synthetic Rubber Co., Ltd.
X·2: Yoshinox 425 (trade name), manufactured by Yoshitomi Pharmaceutica Inds., Ltd.
X·3: Trade name, morpholine disulfide manufactured by Ohuchi Shinko Kagaku Kogyo Co., Ltd.

Then, cover compositions I to IV were prepared according to the formulation shown in Table 2.

TABLE 2

|  | I | II | III | IV |
|---|---|---|---|---|
| Hi-milan AM7318 X4 | 50 | 0 | 0 | 0 |
| Hi-milan AM7317 X5 | 50 | 0 | 0 | 0 |
| Hi-milan 1706 X6 | 0 | 50 | 60 | 0 |
| Hi-milan 1605 X7 | 0 | 50 | 0 | 0 |
| Hi-milan 1705 X8 | 0 | 0 | 20 | 0 |
| Hi-milan 1855 X9 | 0 | 0 | 20 | 0 |
| Iotek 8000 X10 | 0 | 0 | 0 | 50 |
| Hi-milan AM7315 X11 | 0 | 0 | 0 | 50 |
| Titanium dioxide | 2 | 2 | 2 | 2 |

X4: Hi-milan AM7318 (trade name): ethylene-methacrylic acid copolymer ionomer resin obtained by neutralizing with a sodium ion, manufactured by Mitsui Du Pont Polychemical Co., MI (melt index): 2.1, stiffness: 345 MPa, Shore D-scale hardness: 65

X5: Hi-milan AM7317 (trade name): ethylene-methacrylic acid copolymer ionomer resin obtained by neutralizing with a zinc ion, manufactured by Mitsui Du Pont Polychemical Co., MI: 1.2, stiffness: 310 MPa, Shore D-scale hardness: 64

X6: Hi-milan 1706 (trade name): ethylene-methacrylic acid copolymer ionomer resin obtained by neutralizing with a zinc ion, manufactured by Mitsui Du Pont Polychemical Co., Mi: 0.8, stiffness: 260 MPa, Shore D-scale hardness: 61

X7: Hi-milan 1605 (trade name): ethylene-methacrylic acid copolymer ionomer resin obtained by neutralizing with a sodium ion, manufactured by Mitsui Du Pont Polychemical Co., MI: 2.8, stiffness: 310 MPa, Shore D-scale hardness: 62

X8: Hi-milan 1705 (trade name): ethylene-methacrylic acid copolymer ionomer resin obtained by neutralizing with a zinc ion, manufactured by Mitsui Du Pont Polychemical Co., MI: 5.5, stiffness: 250 MPa, Shore D-scale hardness: 62

X9: Hi-milan 1855 (trade name): ethylene-butyl acrylate-methacrylic acid terpolymer copolymer ionomer resin obtained by neutralizing with a zinc ion, manufactured by Mitsui Du Pont Polychemical Co., MI: 1.0, stiffness: 90 MPa, Shore D-scale hardness: 55

X10: Iotek 8000 (trade name): ethylene-acrylic acid ionomer resin obtained by neutralizing with a sodium ion, manufactured by Mitsui Du Pont Polychemical Co., MI: 0.8, stiffness: 370 MPa, Shore D-scale hardness: 64

X11: Hi-milan AM7315 (trade name): ethylene-methacrylic acid copolymer ionomer resin obtained by neutralizing with a zinc ion, manufactured by Mitsui Du Pont Polychemical Co., MI: 1.1, stiffness: 315 MPa, Shore D-scale hardness: 64

Then, the rubber compositions for core A to F described in Table 1 were vulcanized under the vulcanization conditions shown in Tables 3 to 5 to produce a core and it's hardness was measured by a JIS-C type hardness tester, respectively. The results are shown in Tables 3 to 5, respectively. Since the rubber composition for core was vulcanized in two stages by changing the temperature in Examples 1 to 3 and Comparative Examples 1 to 6, two kinds of the temperature/time are described separately in Tables 3 to 5. The hardness of the interior of the core was determined by cutting the core into halves, followed by measuring at the predetermined position, respectively.

The cores produced as described above were covered with cover compositions I to IV described in Table 2 according to the combination shown in Tables 3 to 5 to prepare a two-piece solid golf ball having an outer diameter of 42.7 mm, respectively. The covering of the cover was conducted by an injection molding.

The specific gravity, thickness and Shore D-scale hardness of the cover are shown in Tables 3 to 5, respectively. The Shore D-scale hardness of the cover was measured according to ASTM D-2240. A sample was made by subjecting the above cover resin composition to hot press molding to form a sheet having a thickness of about 2 mm, followed by standing at 23° C. for 2 weeks.

TABLE 3

|  | Example 1 | Example 2 | Example 3 | Example 4 |
|---|---|---|---|---|
| Rubber composition for core | A | A | F | A |
| Diameter of core (mm) | 35.5 | 35.5 | 35.5 | 35.5 |
| Vulcanization condition (°C. × minute) | 140 × 30 165 × 8 | 140 × 30 165 × 8 | 140 × 30 165 × 8 | 155 × 30 |
| Hardness of core (JIS-C hardness) |  |  |  |  |
| Center | 66.0 | 66.0 | 70.0 | 72.0 |
| Position which is 5 mm away from the center | 65.5 | 65.5 | 70.5 | 68.5 |
| Position which is 10 mm away from the center | 66.5 | 66.5 | 70.5 | 68.5 |
| Position which is 15 mm away from the center | 68.0 | 68.0 | 70.0 | 68.0 |
| Surface | 65.5 | 65.5 | 68.0 | 67.0 |
| Cover composition | II | I | I | II |
| Specific gravity of cover | 0.98 | 0.98 | 0.98 | 0.98 |
| Thickness of cover (mm) | 3.6 | 3.6 | 3.6 |  |
| Hardness of cover (Shore-D scale hardness) | 65 | 67 | 67 | 65 |

TABLE 4

|  | Comparative example 1 | Comparative example 2 | Comparative example 3 |
|---|---|---|---|
| Rubber composition for core | B | C | A |
| Diameter of core (mm) | 35.5 | 35.5 | 35.5 |
| Vulcanization condition (°C. × minute) | 140 × 30 165 × 8 | 140 × 30 165 × 8 | 140 × 30 165 × 8 |
| Hardness of core (JIS-C hardness) |  |  |  |
| Center | 82.0 | 48.0 | 66.0 |
| Position which is 5 mm away from the center | 81.0 | 48.5 | 65.5 |
| Position which is 10 mm away from the center | 80.5 | 46.0 | 66.5 |
| Position which is 15 mm away from the center | 82.5 | 45.5 | 68.0 |
| Surface | 81.0 | 45.5 | 65.5 |
| Cover composition | II | II | IV |
| Specific gravity of cover | 0.98 | 0.98 | 0.98 |
| Thickness of cover (mm) | 3.6 | 3.6 | 3.6 |
| Hardness of cover (Shore-D scale hardness) | 65 | 65 | 71 |

TABLE 5

|  | Comparative example 4 | Comparative example 5 | Comparative example 6 |
|---|---|---|---|
| Rubber composition for core | A | D | E |
| Diameter of core (mm) | 35.5 | 31.7 | 31.7 |
| Vulcanization condition (°C. × minute) | 140 × 30 165 × 8 | 140 × 30 165 × 8 | 140 × 30 165 × 8 |
| Hardness of core (JIS-C hardness) |  |  |  |
| Center | 66.0 | 68.0 | 65.0 |
| Position which is 5 mm away from the center | 65.5 | 67.5 | 64.0 |
| Position which is 10 mm away from the center | 66.5 | 68.5 | 64.5 |
| Position which is 15 mm away from the center | 68.0 | 69.0 | 67.0 |
| Surface | 65.5 | 67.0 | 65.0 |
| Cover composition | III | II | II |
| Specific gravity of cover | 0.98 | 0.98 | 0.98 |

TABLE 5-continued

|  | Comparative example 4 | Comparative example 5 | Comparative example 6 |
|---|---|---|---|
| Thickness of cover (mm) | 3.6 | 5.5 | 2.8 |
| Hardness of cover (Shore-D scale hardness) | 58.0 | 65.0 | 65.0 |

The flight performance (e.g. launch angle, spin amount and flight distance), durability and shot feel of the resulting golf ball were examined. The measuring method or evaluation method of golf balls is as follows:

Flight performance

A No. 1 wood club was mounted to a Swing robot manufactured by True Temper Co., and then a golf ball was hit at a head speed of 45 m/second to measure the launch angle, spin amount and distance to the dropping point (carry). The spin amount is determined by continuously taking the photograph of the hit golf ball.

Durability

A No. 1 wood club was mounted to a Swing robot manufactured by True Temper Co., and then a golf ball was hit at a head speed of 45 m/second. The durability is evaluated by the number of times until breakage arose.

Evaluation criteria:

○: Good

X: Inferior

Shot feel

It is evaluated by hitting a golf ball with a No. 1 wood club by 10 top professional golfers. The evaluation criteria are as follows. The results shown in the Tables below are based on the fact that not less than 8 out of 10 professional golfers evaluated with the same criterion about each test item.

Evaluation criteria:

⊚: Very good

○: Good

Δ: Ordinary

XH: Hard and inferior

XS: Too soft and inferior

The above evaluation results are shown in Tables 6 to 8, respectively.

TABLE 6

|  | Example 1 | Example 2 | Example 3 | Example 4 |
|---|---|---|---|---|
| Launch angle (°) | 11.56 | 11.80 | 11.85 | 11.23 |
| Spin amount (rpm) | 2,680 | 2,630 | 2,600 | 2,700 |
| Flight distance (yard) | 234.2 | 234.8 | 235.3 | 233.1 |
| Shot feel | ○ | ⊚ | ○ | ○ |
| Durability | ○ | ○ | ○ | ○ |

TABLE 7

|  | Comparative example 1 | Comparative example 2 | Comparative example 3 |
|---|---|---|---|
| Launch angle (°) | 10.92 | 11.10 | 12.00 |
| Spin amount (rpm) | 2,800 | 2,730 | 2,580 |
| Flight distance (yard) | 232.5 | 230.3 | 235.6 |

TABLE 7-continued

|  | Comparative example 1 | Comparative example 2 | Comparative example 3 |
|---|---|---|---|
| Shot feel | XH | XS | ○ |
| Durability | ○ | X | X |

TABLE 8

|  | Comparative example 1 | Comparative example 2 | Comparative example 3 |
|---|---|---|---|
| Launch angle (°) | 10.35 | 11.05 | 11.00 |
| Spin amount (rpm) | 2,850 | 2,670 | 2,750 |
| Flight distance (yard) | 231.8 | 233.5 | 232.2 |
| Shot feel | ○ | XH | Δ |
| Durability | ○ | X | ○ |

As is apparent from a comparison between the physical properties of the golf balls of Examples 1 to 4 shown in Table 6 and those of Comparative Examples 1 to 6 shown in Tables 7 and 8, the golf balls of Examples 1 to 4 had good shot feel and excellent flight performance and attained long flight distance. That is, regarding the golf balls of Examples 1 to 4 of the present invention, the core is softened as shown in Table 3 so as to make the shot feel good. However, the flight distance was long such as 233.1 to 235.3 and a decrease in flight distance was not recognized.

To the contrary, regarding the golf ball of Comparative Example 1, the flight distance was long but the shot feel was hard and inferior because the core is hard. Regarding the golf ball of the Comparative Example 2, the flight distance is small because the core is too soft. The shot feel was too soft and inferior, and the durability was also bad. Regarding the golf ball of Comparative Example 3, the durability was inferior because the hardness of the cover was high. Regarding the golf ball of comparative Example 4, the flight distance decreased because the hardness of the cover was low. Regarding the golf ball of Comparative Example 5, the shot feel was hard and inferior because the core is small and the thickness of the cover is large, and the durability was also inferior. Regarding the golf ball of Comparative Example 6, the shot feel was not sufficiently improved because the core was large and the thickness of the cover was small.

What is claimed is:

1. A solid golf ball comprising a core and a cover covering said core, wherein said core has a diameter of not more than 36.7 mm and a hardness (JIS-C hardness) in a range from 65.5 to 72 from a center to an outer surface of said core, said core being formed from a vulcanized molded material of a rubber composition comprising a base rubber, a metal salt of an unsaturated carboxylic acid, an organic peroxide, an organosulfur compound and/or metal-containing organosulfur compound and a filler, a difference between the hardness (JIS-C hardness) at the center of said core and that at any part from the center to the outer surface of said core is not greater than 5 and the cover has a specific gravity of less than 1.2, a thickness of 3 to 5 mm and a hardness (Shore-D scale hardness) of 60 to 70.

* * * * *